United States Patent [19]

Greenwald et al.

[11] 4,302,084
[45] Nov. 24, 1981

[54] AUTOMATIC RANGEFINDING DEVICE FOR USE IN A CAMERA

[75] Inventors: Rogers J. Greenwald; Lawrence J. Matteson, both of Rochester, N.Y.

[73] Assignee: Eastman Kodak Company, Rochester, N.Y.

[21] Appl. No.: 128,754

[22] Filed: Mar. 10, 1980

[51] Int. Cl.³ .............................................. G03B 3/10
[52] U.S. Cl. ...................................................... 354/25
[58] Field of Search ................... 354/25, 60 E, 198; 352/140; 355/56; 350/46; 356/4, 5

[56] References Cited

U.S. PATENT DOCUMENTS

| | | | |
|---|---|---|---|
| 1,866,581 | 7/1932 | Sinajian | 354/25 |
| 3,173,347 | 3/1965 | Stimson et al. | 354/34 |
| 3,465,656 | 9/1969 | Wick et al. | 315/241 P |
| 3,648,104 | 3/1972 | Ackermann | 315/151 |
| 3,684,917 | 8/1972 | Uno et al. | 315/151 |
| 3,709,123 | 1/1973 | Tokutomi | 315/241 P X |
| 3,716,752 | 2/1973 | Iwata | 315/151 |
| 3,759,616 | 9/1973 | Hildebrand | 356/5 |
| 3,809,951 | 5/1974 | Vital et al. | 315/149 |
| 3,813,679 | 5/1974 | Hasegawa et al. | 354/25 |
| 3,836,924 | 9/1974 | Kawasaki | 354/33 |
| 3,842,428 | 10/1974 | Kawasaki | 354/145 |
| 3,846,811 | 11/1974 | Nakamura et al. | 354/145 |
| 3,868,701 | 2/1975 | Kawasaki | 354/33 |

*Primary Examiner*—Michael L. Gellner
*Attorney, Agent, or Firm*—D. R. Arndt

[57] ABSTRACT

A focusing device for use with photographic cameras and the like. This invention uses a light source such as an electronic flash to direct light toward an object to be photographed. When the amount of flash light reflected by the subject reaches a predetermined level, a quench circuit is activated which terminates the light emanating from the light source. A timer measures the elapsed time between the depression of the body release and the generation of the quench signal. Converter means translate the measured time interval into a range signal that is functionally related to the distance between the focusing device and the subject. The range signal may then be used to adjust a camera component such as a lens or may be used to control visual indicia that present readings to the operator indicative of range.

8 Claims, 2 Drawing Figures

AUTOMATIC RANGEFINDING DEVICE FOR USE IN A CAMERA

FIELD OF THE INVENTION

This invention relates to an automatic rangefinding device, and more particularly to an automatic rangefinding device for use in a camera of the type wherein an objective lens is to be focused before an object is photographed.

DESCRIPTION OF THE PRIOR ART

Various rangefinding devices have heretofore been proposed which automatically detect the distance between a subject to be photographed and a camera and adjust the camera's objective lens to its correct focal position.

Although many photographic cameras are now provided with means for automatically adjusting the shutter speed and/or lens opening in response to the illumination of the scene to be photographed, only a very few commercially successful cameras have embodied means to determine the distance from the camera to the subject automatically and adjust the camera accordingly. That is, without requiring the photographer to make a manual focus setting based upon his visual estimate of the distance to the subject to be photographed or upon his ability to superimpose one or more images formed by an optical rangefinder device.

While optical ranging techniques are adequate for determining the focus and range of relatively clear or sharp and stationary objects or scenes, they encounter problems in certain situations. For instance, fast-moving objects can be especially difficult to range by optical techniques. Where the time available for performing the step of focusing upon such object is limited by the transient nature of the scene being photographed, the probability of achieving a sharp focus diminishes. In addition, some types of photographic subjects are inherently difficult to range optically. Should the subject be characterized by a lack of sharp features, lines, or contours, the operator or systems may experience considerable difficulty in determining the point of rangefinder image convergence.

U.S. Pat. Nos. 1,866,581 and 3,547,017 to Simjian and Harvey, respectively, disclose systems that will give a fairly accurate indication of the range of the subject from the camera by having a light sensitive element that detects the intensity of the illumination reflected by the subject from a source of illumination. Another example of this type of a system is U.S. Pat. No. 3,813,679 to Hasegawa et al in which the quantity of such light reflected by the object is converted into an electrical signal and stored in a storage means so that lens focus may be effected in accordance with the quantity stored.

U.S. Pat. No. 3,716,752 relates to an electronic flash intensity control circuit, so constructed that its light output for subject illumination during exposure can be readily changed. The stored energy in a main discharge capacitor is used to produce a first pulse of light. Light reflected from the subject then effects a photo-resist element whose resistance is directly proportional to the reflected light detected during this first pulse of light. A second capacitor is caused to be charged through the photo-resistor from a constant voltage source. This charge forms a voltage potential corresponding to the distance between the object and the light source. The remaining stored energy in the main discharge capacitor is related to range and is eventually used to provide a second pulse of light whose output level is proportional to that needed to produce a suitable exposure.

SUMMARY OF THE INVENTION

The invention now presented provides a rangefinder for photographic devices and the like which effects object distance or range determination by using a preflash. Coupled to the lens system of a photographic camera, the distance-finding device is capable of focusing the lens upon an object within a scene to be photographed. The system readily tracks and focally adjusts to an object moving toward or away from the camera to assure a properly focused exposure.

The present rangefinding and focusing system is further characterized in its capability to operate under even minimal ambient light conditions wherein visible image viewfinding by a camera operator is otherwise not possible. In this regard, the system is fully operable in the total absence of visible ambient illumination.

A further aspect of the invention is the cost saving that is achieved by combining the ranging device with a conventional automatic flash exposure control that uses a quenchable pre-exposure flash. Following initiation of the preflash, a timer measures the elapsed time period between the time that the light sensitive detector initially receives reflected illumination from the preflash and the time the preflash quench signal is generated. A converter can then be used to translate this measured time interval into a range signal which in turn can be used to focus a photographic lens on the camera. Thus, it is possible to derive range information from the circuitry already employed in a quench flash system in a simple straight-forward manner with a minimum of cost.

The novel features considered characteristic of this invention are set forth with particularity in the appended claims. The invention itself, however, both as to its organization and its method of operation, together with additional objects and advantages thereof, will best be understood from the following description of specific embodiments when read in connection with the accompanying drawings in which:

DETAILED DESCRIPTION

The rangefinding apparatus of the invention may be fabricated in a broad variety of configurations. When physically mounted within or upon a camera, however, the apparatus may comprise three basic functional components: a light source, a camera lens actuating system for providing focal adjustment, and intermediate control circuitry. Each of these components is interrelated with the others in a manner providing not only for position-responsive feedback by the objective lens system of a camera but also providing a range limiting feature serving to limit the object distance signal introduced to the lens system actuator to a maximum value corresponding to the infinity setting of the lens. The use of this ranging system permits consistently accurate focusing within the object distance commonly encountered in the photographic field.

Figure 1:
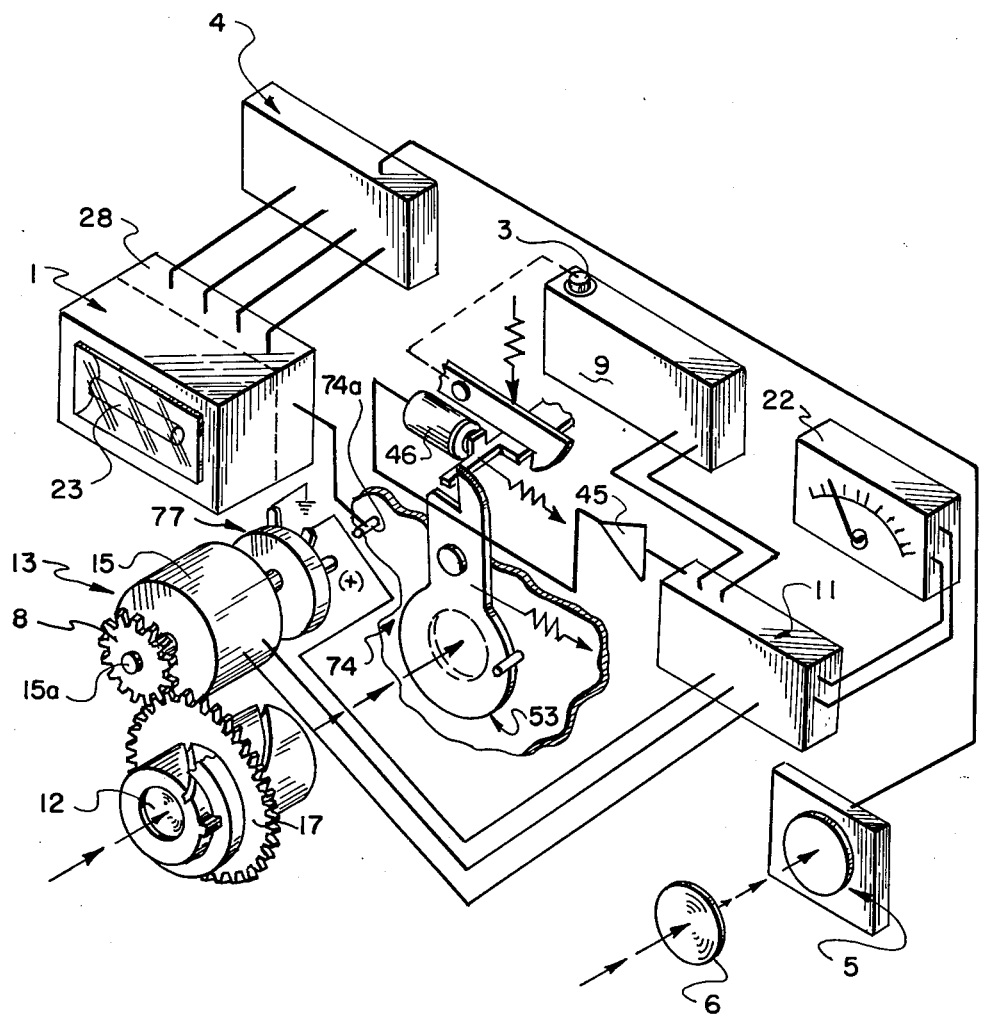
FIG. 1 illustrates diagrammatically an optical system to be employed in a distance measuring device according to the present invention.

Initially, reference will be made to the rangefinding apparatus shown in FIG. 1. Light rays emanating from a light source 1, such as an electronic flash unit which is actuated by a body release 3, is allowed to impinge on the object of a photographic scene (not shown). A portion of the light rays reflected back towards the camera can be collected by lens 6. These reflected light rays are then focused by the lens onto a light sensitive device 5 which may comprise a photovoltaic cell or photodiode. The device 5 also includes an integrating capacitor 7 (See FIG. 2) and thus is adapted to provide a measure of the total amount of light reflected by the subject.

When the amount of flash light collected by lens 6 reaches a predetermined level, a quench circuit 4 is activated which terminates the light emanating from the light source 1. A timer 9 measures the elapsed time between depression of the body release 3 and the generation of the quench signal. Converter means 11 translates the measured time interval into a range signal that is functionally related to the distance between the focusing device and the subject. This range signal is inputted to a lens system adjusting mechanism such as that shown generally at 13. A lens 12 is focused by causing axial translation of one or more of its lens elements. This translation is effected by operation of a DC servo motor 15 having a gear 8 on a shaft 15a which is operatively associated with a peripheral geared ring member 17 on the lens 12. Thus, operation of the motor 15 results in a corresponding change in the focus of the lens 12. After the lens has been properly focused a shutter 53 is released to allow the exposure to be made. The exposure could be either an available light exposure or the light source could be activated again at a much higher level, thereby providing the required artifical illumination for the exposure. If desired, costs could be reduced substantially by eliminating the lens adjusting mechanism 13 and using the information outputted by the converter 11 to operate a readout that may be in the form of a visual display 22, such as a digital display, meter, or light emitting diode display commonly known to those skilled in the art. The camera operator would then be able to use this information to manually adjust the lens to the proper focus setting.

Figure 2:
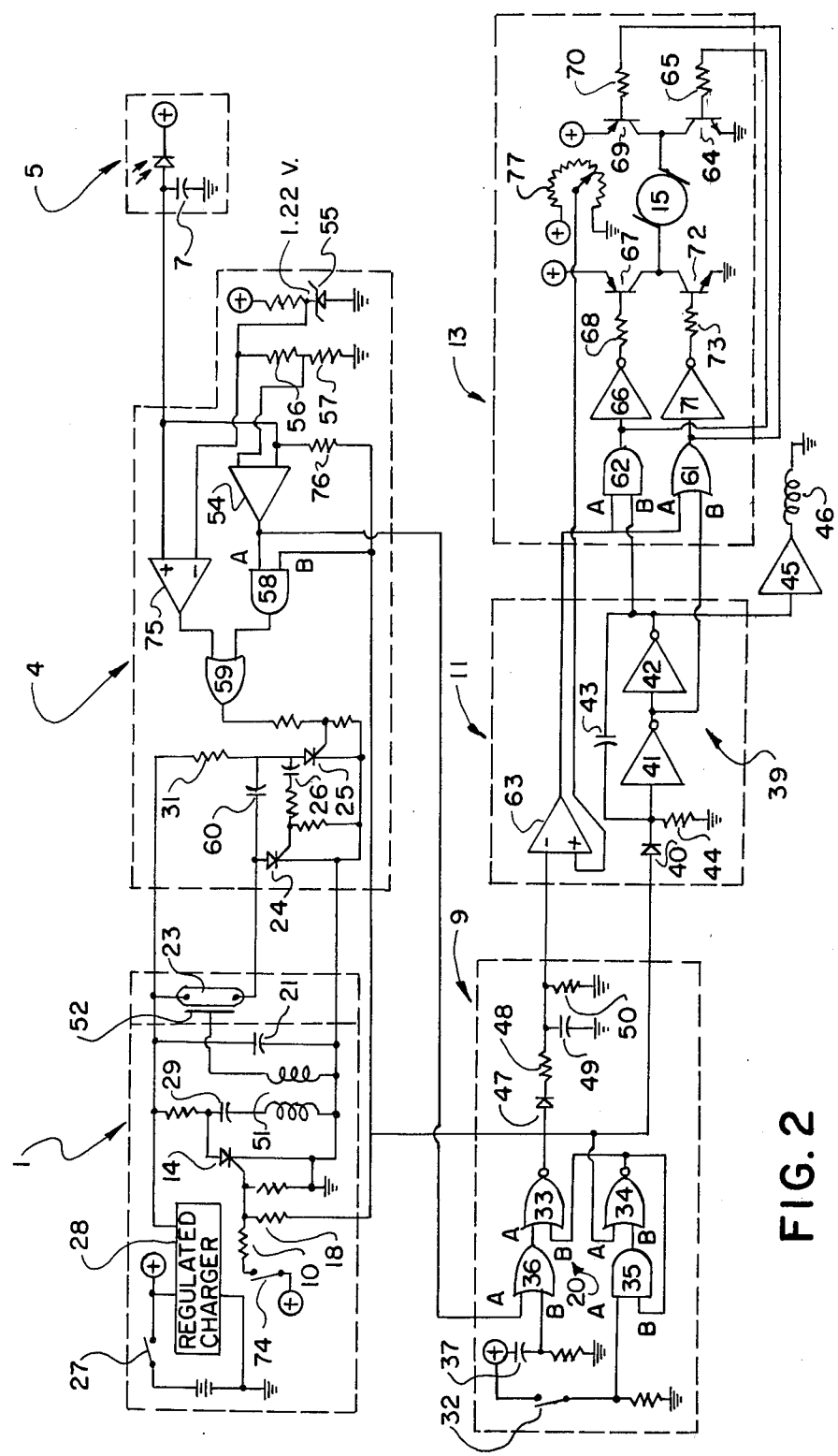
FIG. 2 is an electrical circuit diagram to be used in the distance measuring device.

FIG. 2 schematically illustrates in more detail the circuitry for an automatic focusing device and includes, among other things, a discharge capacitor 21, a flashtube 23, two thyristors 24 and 25 each with its own ignition circuit, a switching capacitor 26 and an input signal derived from a quench circuit 4 that is controlled by the light sensitive device 5.

Closure of an on/off switch 27 activates a regulated charger 28 which in turn commences charging of the energy storage capacitor 21 to a voltage of approximately 330 volts. The on/off switch 27 may be actuated to the closed position by gripping of the camera by the operator or movement of a camera member that is responsive either to erecting of the camera or to moving of the flash device to its operative position. The regulated charger would continue to operate by suitable means not shown to regulate the voltage on the capacitor 21 either for an indefinite period of time or until turned off by folding of the camera or movement of the flash unit to its storage position. Alternatively, the charger may be automatically turned off if not operated within a predetermined period of time from the last exposure or flash operation. During charging, a trigger capacitor 29 is brought to the same voltage potential as capacitor 21. This potential is also applied across the electrodes of a flashtube 23 that is in series with the thyristor 24 which is normally blocked (or off). The voltage potential on the capacitor 21 is equally applied to the switching capacitor 26 via the resistors 30 and 31. This voltage potential is equally applied to the anode of the thyristor 25, which is normally blocked, via the resistor 31.

The ranging flash is initiated by the closure of trigger switch 32 which is actuated by travel of the body release 3 to a first position. Prior to actuation of the switch 32 or in response to an initial movement of body release 3, a flip-flop 20 comprised of NOR gates 33 and 34 is in a re-set condition with the output of NOR gate 34 at a logic high. Closure of switch 32 results in a positive voltage on the A input of AND gate 35; also, a positive transient is applied to the B input of OR gate 36 at the junction of capacitor 37 and resistor 38 resulting in a logic high at the output of OR gate 36. This results in a change in the re-set flip-flop so that the output of NOR gate 33 is at a logic high and the output of NOR gate 34 is at a logic low thereby causing the B input of AND gate 35 to go low which changes the output of AND gate 35 to a logic low. With the high pulse removed from the B input of NOR gate 34, the flip-flop will remain in the set state; that is, with the output of NOR gate 33 high and the output of NOR gate 34 being at a logic low. This means that subsequent actuation of trigger switch 32 from bouncing or jittery fingers will have no effect on the output of the flip-flop until a reset pulse is received at input A of OR gate 36.

When the output of NOR gate 33 goes to a logic high that is inputted to a pulse stretcher circuit shown generally at 39 via diode 40 to inverter 41, the output of which goes to a logic low which in turn is inputted to inverter 42, the output of which goes to a logic high. Capacitor 43 provides feedback from the output of inverter 42 to the input of inverter 41 and holds the input high for some period of time after the output of NOR gate 33 returns to its normal logic low state. When the NOR gate 33 returns to its logic low state, diode 40 prevents charge from being drawn off capacitor 43 to NOR gate 33. Thus, the charge on capacitor 43 must bleed through a resistor 44. Accordingly, the time constant established by resistor 44 and capacitor 43 determines the duration that the enable pulse or logic high exists at the output of inverter 42. This enable pulse performs two functions: first, it determines how long power will be applied to the motor 15 that focuses the lens 12 (FIG. 1); this will be discussed in detail shortly. Second, the enable pulse is used to turn on an amplifier 45 the output of which energizes a holding solenoid 46. While the enable pulse is present, the amplifier 45 keeps the solenoid energized and the shutter is prevented from opening even though it was mechanically released at the time the body release was pressed. This ensures that the picture is not taken until after the motor has had an opportunity to focus the lens.

With the output of NOR gate 33 going to a logic high, current starts flowing through diode 47 and resistor 48. In response to this current, timing circuit 9 starts a timing operation via time integrating capacitor 19. A predetermined rate of charging is established by the time constant formed by resistor 48 and capacitor 49. The current will continue to flow until the output of NOR gate 33 goes to a logic low, at that time the diode 47 will be back biased preventing current from flowing out of capacitor 49 back into NOR gate 33. The voltage on capacitor 49 is inputted to the negative input of a voltage comparator 63 and will remain relatively constant even though it is allowed to discharge very slowly through parallel resistance 50 which is a very large resistor.

SCR 14 is also triggered via resistor 18 into conduction by the output of NOR gate 33 going to a logic high in response to closure of trigger switch 32, resulting in the discharge of capacitor 29. Current from the capacitor is thus caused to flow through the primary winding of trigger transformer 51. Current flow in the primary results in an induced current pulse in the secondary and trigger electrode 52, resulting in the ionization of the gas in the flashtube 23. As a result of this ionization, there is a large change of voltage per unit time at the anode of thyristor 24 which is sufficient to cause the thyristor to conduct. As soon as the thyristor 24 is conducting, the discharge current from capacitor 21 in the flashtube 23 is established.

The discharge in the flashtube 23 results in illumination of the object and a portion of and the reflected light is received by the light sensitive device 5 which in turn generates a current that charges capacitor 7. The voltage on the the integrating capacitor 7 is inputted to the negative input of a comparator 54. When this voltage has reached a value equal to a level determined by a reference voltage applied to the positive terminal of the comparator 54, the output thereof goes to a logic high. Because the ranging flash need not be as long as the exposure flash, a substantial amount of energy may be saved by terminating or quenching the flash earlier and thereby maintaining whatever energy may be left in the capacitor 21 for the exposure flash. Therefore instead of using a reference voltage of 1.22 V established by zener diode 55 a lower voltage is used, one established by a voltage divider consisting of resistors 56 and 57 which are used to reduce the level at which the device will operate to terminate or quench the ranging flash.

A logic high level signal at the output of comparator 54 resets the flip-flop 20 when the logic high is inputted to terminal A of OR gate 36 as mentioned earlier. This results in the output of NOR gate 33 going to a logic low; stopping the time integration by capacitor 49.

In addition, the logic high level signal at the output of comparator 54 causes the output of NAND gate 58 to go to a logic high which in turn results in the output of OR gate 59 going to a logic high and turning on the control electrode of the commutating thyristor 25. When thyristor 25 begins to conduct, it results in the discharge of capacitor 60 into thyristor 24. The voltage on the anode of the thyristor 24 is thus inverted during the duration of the discharge of the capacitor 60 and the thyristor 24 ceases to conduct. Because thyristor 24 stops conduction, the discharge current is interrupted, the tube de-ionizes, and the flash extinguishes. As soon as the discharge currents of the capacitors 60 and 26 become low enough, the thyristor 25 is blocked and the whole system goes back to the initial state. Furthermore, the ignition of the thyristor 25 generates a negative pulse to the control electrode of the thyristor 24 due to the capacitor 26 via resistor 30, which has an effect of diminishing the turnoff time of the thyristor 24.

After the ranging flash has been extinguished and the flip-flop 20 is being re-set, there is a stored charge on capacitor 49 in the timer 9 that is representative of the distance of the object from the camera, by virtue of being a measure of the time that it took to generate a quench signal for the ranging flash.

It should be noted that when an enable or logic level high signal is present on the output of an inverter 42, a logic low is on the output of inverter 41; the output of these inverters is inputted to the B inputs of AND gate 62 and OR gate 61, respectively. These B inputs establish the time when the motor commences to run. The direction that the motor will turn is determined by the output of comparator 63.

As may be recalled, the negative input terminal of comparator 63 senses the voltage potential on capacitor 49 and compares it with the voltage potential on the positive input terminal which is derived from potentiometer 77. The position and potential of the potentiometer's movable contact terminal is representative of lens position. The system will function to make the two voltages inputted to comparator 70 match. This is accomplished by operating the motor which also moves the potentiometer's movable contact terminal so that its output will match the voltage stored in capacitor 50. The turns on the potentiometer are configured in a non-linear fashion to match the charge characteristics of capacitor 49. Therefore if the difference between the voltages at the positive and negative input terminals of comparator 70 are positive, the output will go to a logic high. On the other hand, if the difference between the voltages is negative, then the output will be a logic low.

Thus, it can be seen that when an enable pulse is present, that is the output of inverter 42 is at a logic high and the output of inverter 41 is a logic low; the particular pair of transistors which is turned on is a function of whether the output of comparator 63 is a logic high or a logic low.

When the outputs of comparator 63 and inverter 42 are each at a logic high signal level it results in AND gate 62 having a logic high on both its A and B inputs. This causes the output of the AND gate to go to a logic high which is impressed on the base of NPN transistor 64 via a resistor 65 causing transistor 64 to conduct. The logic high at the output of AND gate 66 is inputted to inverter 66 which outputs a logic low that is impressed on the base of PNP transistor 67 via resistor 68, thus causing conduction of transistor 67. In response to this condition, current flows from the positive supply on the emitter of transistor 67 through the emitter-collector junction of transistor 67 and the motor 15 to ground via transistor 64, thereby causing the motor 15 to rotate in a first direction.

During the time that motor 15 is rotating in a first direction, the following conditions exist in the remainder of the motor control circuit. Input A of OR gate 61 is at a logic high as a result of the output of comparator 63 being at a logic high. Input B of OR gate 61 is at a logic low because the output of inverter 41 is at a logic low when the flip-flop 20 is reset after quenching of the ranging flash. Thus, the output of OR gate 61 is at a logic high which in turn is impressed on the base of PNP transistor 69 via resistor 70 rendering the transistor non-conductive. The logic high at the output of OR gate 61 is also inputted to inverter 71, the output of which is a logic low which in turn is impressed on the base of NPN transistor 72 via resistor 73 rendering the transistor non-conductive.

There will now be considered the other possible condition that may exist while an enable pulse is present at the output of inverter 42, i.e. where the output of comparator 63 is a logic low. This would occur where the positive input coming from the potentiometer 77 is less than the negative input of the comparator 63 derived from the output of timing capacitor 49. Looking at AND gate 62, it can be seen that the A input would be at a logic low and the B input would be at a logic high and therefore the output of the AND gate 62 would be a logic low. A logic low output there results in the base of NPN transistor 64 receiving a low voltage on its base via resistor 65. The base of the PNP transistor 67 receives a high voltage from inverter 66 via resistor 68. Therefore, both transistors 64 and 67 are rendered non-conductive. OR gate 61 would have a logic low on input A from comparator 63, and a logic low on input B from inverter 40 so that the output of OR gate 61 would be a logic low. Thus, a logic low would be present on the base of PNP transistor 69 via resistor 70. A logic high would be present at the output of inverter 71 which in turn is applied to the base of NPN transistor 72 via resistor 73. Thus, it can be seen that both transistors 69 and 72 would be rendered conductive allowing current to flow from the positive supply on the emitter of transistor 69, through the emitter-collector junction of transistor 69, through motor 15 and collector-emitter junction of transistor 72 to ground, thus causing the motor to rotate in a second direction.

Once the enable pulse is present, the motor can begin rotation with the direction of rotation being determined by the logic state of the output of comparator 63. The enable pulse will be present for approximately 100 ms. This period of time is sufficient for the motor to travel the maximum distance that it will ever have to travel to focus the lens, which is from the lens near position to the lens far position. After focusing has taken place, and the 100 ms. period has elapsed, the enable pulse will be removed causing amplifier 45 to de-energize the solenoid 46 that holds the shutter blade; thus, the shutter will open under the influence of spring 10 initiating the exposure period. Release of the shutter blade mechanically operates the x/synch. switch 74 when the shutter hits the rebound pin 74a (FIG. 1), which will again trigger SCR 14 into conduction by applying a positive voltage to the trigger electrode through resistor 10. Capacitor 29 which has had an opportunity to become re-charged during the 100 ms. interval, once again begins to discharge through SCR 14 and the primary winding of the trigger transformer 51. The induced pulse in the secondary causes the flash to fire, as previously described. It should be noted that a substantial amount of charge remains in the main discharge capacitor 21 because only a small amount of energy is necessary for ranging purposes.

Firing of the flashtube 23 the second time once again results in the illumination of the object and the reflected light is received by the light sensitive devices, which in turn generates a current that charges capacitor 7. That voltage is applied to the positive input of photoflash quench comparator 75. When the voltage on the integrating capacitor 7 has reached a value equal to a reference voltage of 1.22V established by zener diode 55 applied to the negative input of a comparator 75, the output of that comparator will go to a logic high. Because maximum light output is required for the exposure flash, the full reference voltage of 1.22 V established by zener diode 55 is inputted to the negative input of comparator 75.

The logic high on the output of comparator 75 is inputted to OR gate 59 causing its output to go to a logic high and turn on the control electrode of the commutating thyristor 25. This results in the quenching of the flash after the proper amount of light has illuminated the subject being photographed so as to insure the proper exposure. The actual quenching operation has been described in detail earlier.

There are events that if they occurred, would tend to disturb the sequence of operation previously described. One such event could result if the trigger switch 32 had been closed prematurely by depression of the body release 3; that is, before the energy storage capacitor 21 had a chance to become fully charged. In such case, when SCR 14 is turned on there would not be enough energy available to trigger the flashtube. However, the logic circuitry would continue to function even though the flash failed to fire. Because the flash unit did not fire, the photocell 5 would not receive any reflected light so that the capacitor 7 would not commence charging and would never reach the level of the reference voltage being inputted to comparator 54. This would prevent the output of comparator 54 from going to a logic high, a condition that would ultimately result in the quenching of the ranging flash. Because there would be no quench, the time integrating capacitor 49 would continue to charge for an indefinite period of time. To prevent the foregoing from happening, a current limiting resistor 76 allows a small amount of current to flow from the output of NOR gate 33 through resistor 76 to integrating capacitor 7; when the output of the NOR gate is at a logic high in response to the closure of the trigger switch 32. This current is very small so that it does not impart substantial error to the measurement of the photocurrent. This current flow establishes a maximum time interval for the timing capacitor 49. This maximum time period corresponds to the maximum range that the system would focus. It is also possible to sense this condition in a manner not shown so that when this condition exists, the lens will be moved to a hyperfocal setting or the camera viewfinder obscured by a liquid crystal device to dissuade the operator from initiating an exposure under this condition.

A second condition that is even more likely to occur is that the flashtube might go off when the ranging flash is fired but no light is reflected from the subject (i.e. mountains in the distance), because the object is at too great a distance. Once again, no current would be integrated by the capacitor 7 so that comparator 54 would not output a logic high required to quench the ranging flash. Again, the small current through resistor 56 is used to slowly charge capacitor 7 during a predetermined maximum time interval. It is this time interval that determines the duration of the ranging flash. If the duration of the ranging flash is not controlled, the flashtube will continue to drain energy from the discharge capacitor until depleted to the point that no energy is available for the exposure flash.

Resistor 76 is also used to discharge capacitor 7 to its zero-volt initial condition before actuation of the main flash, which is a necessary requirement for accurate measurement of the reflected scene light.

Thus, it is apparent that there has been provided, in accordance with the invention, a focusing device that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

We claim:

1. In a camera having an objective lens and an adjustable component for adjusting a focal characteristic of the objective lens, a device for measuring distance to a reflective subject, comprising:
   a light source of predetermined intensity for illuminating the subject;
   means for activating the light source;
   light sensitive means for detecting light emitted by the light source and reflected from the subject and for generating an output signal related to the reflected light so detected;
   integrating means coupled to the light sensitive means for producing a trigger signal when the total amount of reflected light received by the light sensitive means reaches a predetermined value;
   timer means for measuring the time interval between activation of the light source and generation of the trigger signal;
   converter means coupled to the timer means and responsive to the trigger signal for generating a range signal as a function of the measured time interval; and
   means coupled to said converter means and responsive to said range signal for adjusting said camera component.

2. A measuring device in accordance with claim 1 including readout means for translating the range signal into visual indicia indicative of range.

3. An automatic focusing device in a photographic camera having a focusable objective lens comprising in combination:
   a source of illumination for illuminating at least a portion of an object to be photographed;
   means for activating said source to produce illumination;
   detector means disposed to receive illumination of the source reflected from the object and generate an output signal related to the amount of said reflected illumination;
   integrating means coupled to the detector means for producing a trigger signal when the total amount of reflected illumination received by the detector means reaches a predetermined value;
   timer means for measuring the time interval between activation of the source of illumination and generation of the trigger signal;
   converter means coupled to the timer means for generating a range signal as a function of the measured time interval; and
   focus control means coupled to said converter means so that the input thereof receives the output from said converter means so that said focus control operates the focusing movement of said objective lens in response to said inputted signal.

4. Apparatus for causing a lens system of a camera to be focused upon an object separated therefrom by an object distance, the apparatus comprising:
   a source of illumination for illuminating at least a portion of the object to be photographed;
   detector means disposed to receive illumination reflected from the object and generate an electrical output signal proportional to the amount of said reflected illumination;
   integrating means coupled to the detector means for producing a trigger signal when the total amount of reflected light received by the detector means reaches a predetermined value;
   timer means for measuring the elapsed interval between activation of the source of illumination and generation production of the trigger signal;
   converter means for translating the measured time interval into a range signal that corresponds to said object distance; and
   lens system adjustment means responsive to said range signal for focusing said lens system at the object distance.

5. A photographic camera including means for supporting a film unit at a film exposure plane, the camera comprising:
   a lens system adapted to be focused upon a remote subject;
   a shutter mechanism for controlling an exposure period wherein light is admitted into the camera through the lens system for exposure of the film unit;
   an electronic flash unit of predetermined intensity for illuminating the subject;
   a body release which actuates (a) the flash unit; and thereafter, (b) the shutter mechanism to initiate the exposure period;
   light sensitive means for detecting light emitted by the electronic flash unit and reflected from the subject and for generating an electronic output signal related to the reflected light so detected;
   integrating means coupled to the light sensitive means for producing a trigger signal when the total amount of reflected light received by the light sensitive means reaches a predetermined value;
   timer means for measuring a time interval in which the light sensitive means receives the reflected light from the flash unit;
   converter means coupled to the timer means for generating a range signal as a function of the measured time interval; and
   adjusting means responsive to said range signal for adjusting said camera lens system to focus said subject on the film exposure plane prior to initiation of the exposure period by said shutter mechanism.

6. The invention as set forth in claim 5 wherein the trigger signal is also used to quench the illumination from the flash unit.

7. The invention as set forth in claim 5 or 6 and including means for inhibiting the adjusting means during the exposure period and for activating the flash unit during the exposure period to produce illumination for illuminating the subject.

8. The invention as set forth in claim 5 and including holding means for securing the shutter in a closed position in which position an exposure of the film unit is prevented and wherein movement of the body release actuates said holding means to retain the shutter in the closed position, preventing initiation of the exposure period until the lens system has had adequate time to focus and means responsive to deactivation of said holding means that allows said shutter to open and initiate the exposure period.

* * * * *

UNITED STATES PATENT OFFICE
CERTIFICATE OF CORRECTION

PATENT NO. : 4,302,084                              Page 1 of 2
DATED     November 24, 1981
INVENTOR(S) : Greenwald et al It is certified that error appears in the above-identified patent and that said Letters Patent are hereby corrected as shown below:

Column 5, line 20    after "of" delete "and"

Column 6, line 16    after "comparator", change "70" to --63--

Column 6, line 19    after "capacitor", change "50" to --49--

Column 6, line 24    after "comparator", change "70" to --63--

Column 6, line 39    after "gate", change "66" to --62--

Column 7, line 35    after "of", insert --a--

Column 7, line 35    after "spring", delete "10"

UNITED STATES PATENT OFFICE
CERTIFICATE OF CORRECTION

PATENT NO. : 4,302,084
DATED : November 24, 1981
INVENTOR(S) : Greenwald et al

It is certified that error appears in the above-identified patent and that said Letters Patent are hereby corrected as shown below:

Title Page,"line"75    change "Rogers" to read --Roger--

Column 4, line 61    delete "19" and substitute therefor --49--

Column 10, line 55    "5" is illegible in copies of printed patent; please re-print the numeral "5" to make it legible Signed and Sealed this Twenty-second Day of June 1982

[SEAL]

Attest:

Attesting Officer

GERALD J. MOSSINGHOFF
Commissioner of Patents and Trademarks